F. W. RAVEN.
PROTECTED LOOK-OUT DEVICE.
APPLICATION FILED SEPT. 3, 1914.
1,288,677.  Patented Dec. 24, 1918.
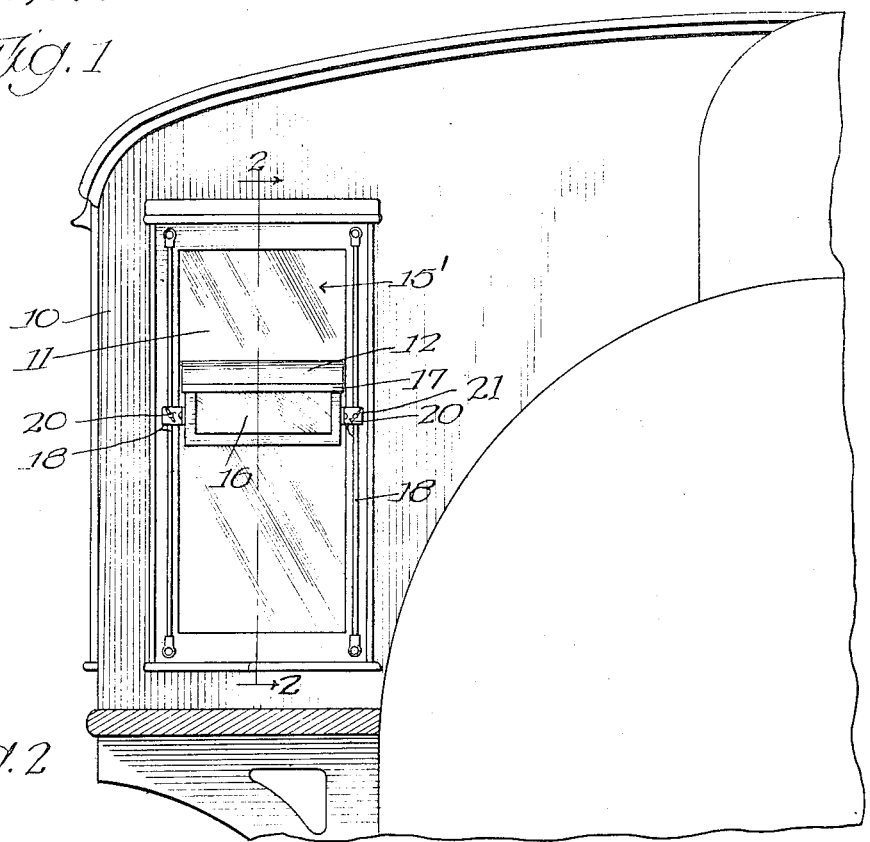
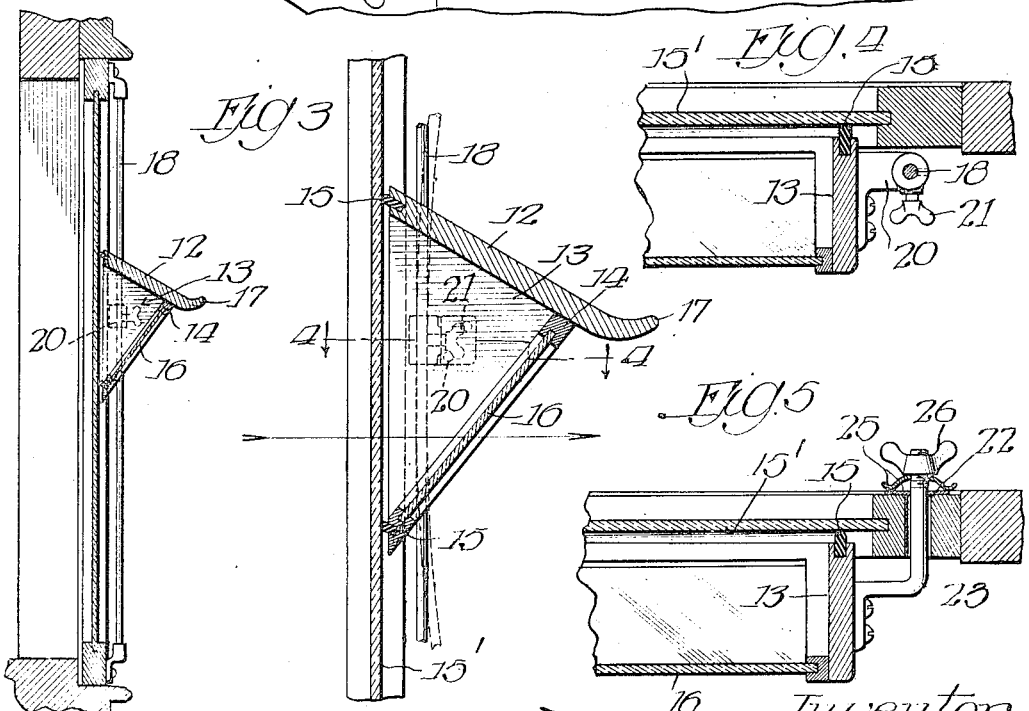

UNITED STATES PATENT OFFICE.

FREDERICK W. RAVEN, OF CHICAGO, ILLINOIS.

PROTECTED LOOK-OUT DEVICE.

1,288,677.  Specification of Letters Patent.  Patented Dec. 24, 1918.

Application filed September 3, 1914. Serial No. 859,982.

*To all whom it may concern:*

Be it known that I, FREDERICK W. RAVEN, a citizen of the United States, and a resident of Chicago, in the county of Cook and State of Illinois, have invented certain new and useful Improvements in Protected Look-Out Devices; and I do hereby declare that the following is a full, clear, and exact description thereof, reference being had to the accompanying drawings, and to the characters of reference marked thereon, which form a part of this specification.

This invention relates to a novel protected look-out for windows, and the invention is designed to provide means whereby a limited portion of a look-out window may be protected from the elements, and also from differential temperatures on the inside of and the outside of the window pane, so as to avoid the obscuring of the view therethrough due to the collection of rain, snow or sleet on the exterior of the window pane, and to prevent the condensation of moisture on the inside of the pane in the event that the external temperature is considerably below that of the internal temperature.

A protected look-out embodying my invention is especially adaptable to the look-out windows of locomotive cabs, cars and like conveyances, but it may also be adapted to the look-out windows of pilot houses of steam boats and the look-out windows of lighthouses, towers and like structures, and it may be further adapted in like manner to protect a limited area of windshields of automobiles.

A practical embodiment of my invention may comprise, in combination with the pane of the look-out window, a box or inclosure which is open at its rear side to fit against said pane, and to form at the front of the pane a dead air space which insulates the portion of the window pane immediately in rear thereof from the external temperature, the front wall of the box comprising a supplemental pane arranged in the line of vision of the observer in rear of the look-out window, and the top of the inclosure being so arranged relatively to the supplemental pane as to protect it against snow, sleet and rain. The dead air space inclosed by the box and the window pane prevents access of moisture and cold external air to the limited protected area of the window pane and thus avoids condensation of moisture on the window and the supplemental pane. The wall of the box or inclosure at the front thereof is arranged to shield the supplemental pane, which constitutes the front wall of the box, and bears such angular relation thereto as to shield the supplemental pane from driving rain, snow and sleet, so that said supplemental pane is maintained unobstructed for a clear vision.

The open side of box or inclosure is pressed against the pane of the look-out window in any suitable manner, and preferably the rear edges of the inclosure walls at the open side thereof are provided with packing strips which engage the window pane to afford an air tight joint between the box and the window pane to prevent leakage of air to the space between the box or inclosure and the look-out window pane.

A further feature of the invention resides in the mounting of the protected look-out device in such manner as to enable it to be vertically adjusted to correspond to the line of vision of the observer in the cab or other inclosure and the plane in which the points to be observed are located, as the signals along the right of way of a railroad and track conditions, and to permit said device to be raised or lowered out of the look-out line of vision.

The invention, in its broader aspects, is capable of assuming various structural forms to adapt it to different locations and to different preferred designs. I have herein shown the invention as applied to the look-out window of a locomotive cab and in the following description specific reference will be made to this particular adaptation and also to the preferred embodiments therein shown; but it will be understood that such specific reference is not intended to limit the invention beyond the scope embraced in the claims hereto appended or as imposed by the prior art.

In the drawings:—

Figure 1 is a front elevation of a look-out window showing my protected look-out device applied thereto, and also showing the relation thereof to the cab and to the boiler of the locomotive.

Fig. 2 is a vertical section on the line 2—2 of Fig. 1.

Fig. 3 is an enlarged sectional detail similar to that shown in Fig. 2.

Fig. 4 is a horizontal section on the line 4—4 of Fig. 3.

Fig. 5 is a sectional detail illustrating a modification of the look-out device holding means.

As shown in the drawings, 10 designates a locomotive cab provided with the usual front look-out window or door 11. In practice, the locomotive may be equipped at both the engineer's and the fireman's side of the cab with my improved protected look-out but, for the purpose of this description, but one of the windows has been shown.

My novel protected look-out comprises a box-like inclosure which consists of a top wall 12, end walls 13, 13 and a front oblique wall 14, the box being of general triangular cross section. As herein shown, the front wall is inclined forwardly and upwardly to the plane of the window pane, and the top wall 12 is inclined forwardly and downwardly from said plane, and extends at its forward edge beyond the forward margin of the front wall in overhanging relation thereto. The box is open at its rear side and the rear edges of the top, end and front walls are preferably grooved to receive packing strips 15 made of rubber, felt or other suitable yielding material and which bear against the look-out window pane 15' so as to provide an air tight joint between the box inclosure and the window pane, to thereby prevent interchange of air from the exterior to the interior of the inclosure. The front wall of the inclosure consists principally of a second or supplemental pane of glass 16 which is mounted in a suitable sash that constitutes part of the front wall and which is rigidly fixed to the triangular end walls and to the top wall of the box. The inclination of the top wall relatively to the supplemental pane 16 is such as to protect the outer or supplemental pane 16 from driving snow, sleet and rain. Preferably, the extreme front edge or lip 17 of the overhanging top wall 12 is raised slightly beyond the general plane of the wall so as to prevent water from dripping directly over the edge of the lip, the lip serving to form a trough to direct water toward the outer ends of the top wall. The said box or inclosure may be made of wood, metal or any other suitable material, and the particular manner of constructing the same is not essential to the invention in its broader scope, and need not be further specifically described.

One means of mounting the box or inclosure in place and holding it pressed against the look-out window pane is shown in Figs. 1, 2, 3 and 4. As therein shown the support consists of two vertical rods or bars 18, 18, arranged one in front of each of the sash stiles and bolted or screwed to the top and bottom rails. The said rods or bars 18 are shaped to normally bow inwardly toward the sash stiles when unrestrained. The connections between the supporting bars 18 and the look-out box, as herein shown, consist of lugs 20, 20 which are attached to and extend endwise from the triangular end walls 13 of the box. They are provided with apertures through which the rods 18 extend and upon which the lugs slide. The lugs may be locked to the rods or bars by means of the thumb screws 21, shown in Fig. 4. The attaching lugs 20, which travel in a straight path when the box is moved upwardly or downwardly, are so located with relation to the bars 18 as to spring said bars outwardly, so that the resiliency of the bars acts to hold the box pressed firmly against the window pane, and to thereby maintain an air tight joint between the box and the look-out window pane. The box may be vertically adjusted with respect to the window pane by releasing the thumb screws 21 and moving the box up or down and again tightening the thumb screws. In this manner, the sight opening through the look-out may be adjusted to suit persons of different heights and to maintain the proper line of vision through the look-out. Furthermore, the box may be moved upwardly entirely out of the line of vision when its use is not required.

In Fig. 5 I have shown another means of connecting the box to the window frame in a manner to hold the packing strips thereof against the look-out window pane, so constructed as to permit vertical adjustment of the box from the inside of the locomotive cab or other inclosure of which the look-out window constitutes one of the boundary walls. As shown in said figure, the window stiles are slotted at 22 to receive sliding members 23. Said sliding members extend forwardly beyond the window stiles and are turned inwardly and attached to the end walls of the look-out box. The said member 23 extends inwardly beyond the stiles and through springs 25 which bear at their ends against the inner faces of the window stiles at the side of said slots. The supporting members 23 are screw-threaded at their inner ends and are provided with nuts 26 which bear against the central apertured portions of the springs 25, whereby the tension of the springs to hold the rear edges of the box walls, or the packing strips thereof, against the look-out window pane may be adjusted or varied. Any suitable means may be provided to prevent the entrance of rain, wind or snow through the slot 22.

By reason of the vertical movement of the box relatively to and in contact with the main pane, the entire or any portion of the main pane may be cleared of the elements by merely moving the box upwardly and downwardly against said pane. Thus, after a rain or snow, the main pane may be thus cleared and the box moved away from the line of vision and locked in its inoperative position until further occasion for its use.

In the embodiment of the invention herein shown wherein a supplemental pane is provided in front of the main pane the angle of the said supplemental pane is such that should rain, snow or sleet strike the same the glancing impingement of the elements against the pane would prevent the elements clinging to the pane as in the case of a pane located in a vertical plane. When the look-out comprises an inclosure having the front transparent wall shown, external moisture is prevented from entering the space in front of the main pane so as to thereby prevent condensation of moisture on the supplemental pane.

In the broader aspect of the invention, I may provide other means for maintaining in front of the main pane a temperature substantially higher than the external air and approximately equal to that at the inside of the main pane so as to prevent condensation of moisture on the main pane and provide other means to protect the look-out area from air, sleet and snow.

I claim as my invention:—

1. A protected look-out for windows provided with means to detachably connect it to a window frame constructed with means to vertically adjust the look-out, said look-out comprising means to maintain in front of the window pane a dead-air space partially inclosed by said pane and consisting of an inclosure having a transparent front wall and its frame oblique to the pane and in the line of vision, and a top wall oblique to the pane and wall and meeting and joining the frame of the pane for protecting it from rain, snow, or sleet.

2. A protected look-out for windows comprising a box or inclosure open at its rear side and adapted to fit closely at its open side against the window pane to provide an air tight dead air space in front of said pane, the front wall of the inclosure being transparent and oblique to said pane, and provided with a frame which abuts at its lower margin against said pane, and a top wall oblique to said pane and wall and projecting beyond said wall and joining the upper margin of said frame to protect said transparent front wall from snow, rain, and sleet.

3. A protected look-out for windows comprising a box or inclosure open at its rear side and adapted to fit closely at its open side against the window pane to provide a dead air space in front of said window pane, the front wall of the inclosure comprising a transparent pane oblique to the window pane, and the top wall of said inclosure being inclined downwardly and outwardly and overhanging the pane, and joined to the upper member of the pane frame, the lower edge of said top wall being curved upwardly to form a trough to drain water toward the ends of said wall.

4. A protected look-out for windows comprising a box or inclosure to provide a dead air space in front of said pane, said inclosure being open at its rear side and adapted to fit closely at its open side against the window pane and provided with end walls, the front wall of the inclosure comprising a transparent pane and its frame and being inclined upwardly and forwardly from the plane of the window pane, and the top wall of the inclosure overhanging the upper side of said front wall and lying against the upper margins of the end walls and the upper member of the sash frame.

5. A protected look-out for windows comprising a box or inclosure to provide a dead air space in front of said pane, said inclosure being open at its rear side and adapted to fit closely at its open side against the window pane and provided with end walls, the front wall of the inclosure comprising a transparent pane and its frame and being inclined upwardly and forwardly from the plane of the window pane, and the top wall of the inclosure overhanging the upper side of said front wall and lying against the upper margins of the end walls and the upper member of the sash frame, the rear margins of the end walls, the top wall, and the pane frame being provided with packing strips to fit closely against the window pane.

6. A protected look-out for windows comprising a box or inclosure to provide a dead air space in front of said pane, said inclosure being open at its rear side and adapted to fit closely at its open side against the window pane and provided with end walls, the front wall of the inclosure comprising a transparent pane and its frame and being inclined upwardly and forwardly from the plane of the window pane, and the top wall of the inclosure overhanging the upper side of said front wall and lying against the upper margins of the end walls and the upper member of the sash frame, and a supporting means for said inclosure embracing spring means to hold the inclosure tightly pressed against the window pane and constructed to permit the inclosure to be vertically adjusted relatively to the window pane.

In testimony that I claim the foregoing as my invention I affix my signature, in the presence of two witnesses, this 28th day of August, A. D. 1914.

· FREDERICK W. RAVEN.

Witnesses:
W. L. HALL,
RUTH E. ZETTERVALL.